(12) United States Patent
Renehan et al.

(10) Patent No.: US 12,468,961 B2
(45) Date of Patent: Nov. 11, 2025

(54) ALGORITHM SELECTOR FOR PROFILING APPLICATION USAGE BASED ON NETWORK SIGNALS

(71) Applicant: T-Mobile USA, Inc., Bellevue, WA (US)

(72) Inventors: Stewart Renehan, Seattle, WA (US); Jeremy Angel Evan, Seattle, WA (US)

(73) Assignee: T-Mobile USA, Inc., Bellevue, WA (US)

(*) Notice: Subject to any disclaimer, the term of this patent is extended or adjusted under 35 U.S.C. 154(b) by 993 days.

(21) Appl. No.: 17/539,159

(22) Filed: Nov. 30, 2021

(65) Prior Publication Data

US 2023/0169366 A1 Jun. 1, 2023

(51) Int. Cl.
*G06N 5/022* (2023.01)
*G06N 5/04* (2023.01)
*H04L 43/04* (2022.01)
*H04L 67/50* (2022.01)

(52) U.S. Cl.
CPC ............. *G06N 5/04* (2013.01); *G06N 5/022* (2013.01); *H04L 43/04* (2013.01); *H04L 67/535* (2022.05)

(58) Field of Classification Search
CPC .......... G06N 5/04; G06N 5/022; G06N 3/044; G06N 3/045; G06N 3/08; G06N 7/01; G06N 20/00; G06N 20/10; G06N 5/01; G06N 20/20; H04L 43/04; H04L 67/535; H04L 43/00; H04L 41/16; H04L 43/026; G06F 11/34
See application file for complete search history.

(56) References Cited

U.S. PATENT DOCUMENTS

| | | |
|---|---|---|
| 8,392,116 B2 | 3/2013 | Lehmann et al. |
| 8,429,103 B1 | 4/2013 | Aradhye et al. |
| 8,762,302 B1 | 6/2014 | Spivack et al. |
| 9,572,165 B2 | 2/2017 | Keerthi |
| 9,681,332 B2 | 6/2017 | Min et al. |
| 9,823,289 B2 | 11/2017 | Pal |
| 9,824,190 B2 | 11/2017 | Sudharsan |
| 9,825,976 B1 | 11/2017 | Gomez et al. |
| 9,967,293 B2 | 5/2018 | Li et al. |

(Continued)

FOREIGN PATENT DOCUMENTS

| | | |
|---|---|---|
| CN | 107248030 A | 10/2017 |
| CN | 110163233 A | 8/2019 |

(Continued)

OTHER PUBLICATIONS

Rezaei et al., "Large-Scale Mobile App Identification Using Deep Learning," in IEEE Access, vol. 8, pp. 348-362. (Year: 2020).*

*Primary Examiner* — KC Chen
(74) *Attorney, Agent, or Firm* — Perkins Coie LLP (57) ABSTRACT

The disclosed technique incudes a method for dynamically selecting an algorithm that predicts usage of a mobile application based on network signals. In one example, an application profile includes known network signals and designates a best predictive algorithm. When network signals of user devices are subsequently captured, the best algorithms of sufficiently matching profiles are used to estimate application usage. As such, for example, the popularity of a particular application or relationships among applications can be determined for managing the network or for commercial purposes.

20 Claims, 4 Drawing Sheets

(56) References Cited

U.S. PATENT DOCUMENTS

| | | | |
|---|---|---|---|
| 9,996,853 B2 | 6/2018 | Myers et al. | |
| 10,043,591 B1 | 8/2018 | Laborde | |
| 10,063,406 B2 | 8/2018 | Tapia et al. | |
| 10,068,494 B2 | 9/2018 | Ahmad et al. | |
| 10,102,292 B2 | 10/2018 | Vorobev et al. | |
| 10,235,720 B2 | 3/2019 | Abraham et al. | |
| 10,247,566 B2 | 4/2019 | Schelhaas | |
| 10,262,265 B2 | 4/2019 | Lu | |
| 10,296,843 B2 | 5/2019 | Siebel et al. | |
| 10,397,256 B2 | 8/2019 | Kashi et al. | |
| 10,440,503 B2 | 10/2019 | Tapia | |
| 10,460,101 B2 | 10/2019 | Teller et al. | |
| 10,552,505 B2 | 2/2020 | Ezepov | |
| 10,599,877 B2 | 3/2020 | Lam et al. | |
| 10,693,575 B2 | 6/2020 | Jana et al. | |
| 10,708,795 B2 | 7/2020 | Tapia | |
| 10,726,359 B1 | 7/2020 | Drouin et al. | |
| 10,745,263 B2 | 8/2020 | Crouse et al. | |
| 10,748,172 B2 | 8/2020 | Chung et al. | |
| 10,826,902 B1 | 11/2020 | Aksu et al. | |
| 10,914,055 B2 | 2/2021 | Kovscek et al. | |
| 10,949,918 B2 | 3/2021 | Fidanza et al. | |
| 10,963,917 B2 | 3/2021 | Shishkin et al. | |
| 10,994,727 B1* | 5/2021 | Kumar | G08G 1/0129 |
| 11,012,864 B2 | 5/2021 | Das | |
| 11,038,786 B2 | 6/2021 | Dinh et al. | |
| 11,055,668 B2 | 7/2021 | Liu et al. | |
| 11,075,867 B2 | 7/2021 | Kovega et al. | |
| 11,100,188 B2 | 8/2021 | Borisov et al. | |
| 2007/0156696 A1 | 7/2007 | Lim | |
| 2014/0081832 A1 | 3/2014 | Merrill et al. | |
| 2014/0365358 A1 | 12/2014 | Higaki et al. | |
| 2016/0173540 A1* | 6/2016 | Linden | H04L 67/535 |
| | | | 709/228 |
| 2016/0232546 A1 | 8/2016 | Ranft et al. | |
| 2016/0350953 A1* | 12/2016 | Mittelstaedt | H04L 51/043 |
| 2017/0325112 A1 | 11/2017 | John (Eugene) et al. | |
| 2017/0364212 A1* | 12/2017 | Shi | H04L 67/535 |
| 2018/0191867 A1 | 7/2018 | Siebel et al. | |
| 2018/0240023 A1 | 8/2018 | Ivanov et al. | |
| 2018/0260891 A1* | 9/2018 | Merrill | G06N 20/00 |
| 2018/0262991 A1* | 9/2018 | Rao | H04W 52/0261 |
| 2019/0236489 A1 | 8/2019 | Koudal et al. | |
| 2019/0319868 A1 | 10/2019 | Svennebring et al. | |
| 2019/0378163 A1* | 12/2019 | Sussman | G06Q 30/0239 |
| 2019/0385124 A1 | 12/2019 | Newman et al. | |
| 2020/0062274 A1 | 2/2020 | Kowal et al. | |
| 2020/0125586 A1 | 4/2020 | Rezaeian et al. | |
| 2020/0151617 A1* | 5/2020 | Chauhan | H04L 67/535 |
| 2020/0202267 A1 | 6/2020 | Servidone et al. | |
| 2020/0202436 A1 | 6/2020 | Krishnan | |
| 2020/0209013 A1 | 7/2020 | Kornev et al. | |
| 2020/0211053 A1 | 7/2020 | Shishkin et al. | |
| 2020/0342116 A1 | 10/2020 | Agarwal | |
| 2020/0374740 A1 | 11/2020 | So et al. | |
| 2020/0387812 A1 | 12/2020 | Lewis et al. | |
| 2021/0044666 A1* | 2/2021 | Gavin | H04L 43/06 |
| 2021/0123982 A1 | 4/2021 | Pantazis | |
| 2021/0218639 A1 | 7/2021 | Chen et al. | |
| 2021/0248009 A1 | 8/2021 | Yang et al. | |
| 2021/0256310 A1 | 8/2021 | Roberts et al. | |
| 2021/0256562 A1 | 8/2021 | Laserson | |
| 2021/0342785 A1* | 11/2021 | Mann | G06F 40/186 |
| 2021/0374827 A1* | 12/2021 | Price | G06F 40/12 |

FOREIGN PATENT DOCUMENTS

| | | | | |
|---|---|---|---|---|
| CN | 110520872 A | * | 11/2019 | G06F 16/86 |
| CN | 108616816 B | | 7/2020 | |
| CN | 112241331 A | | 1/2021 | |
| CN | 112584417 A | | 3/2021 | |
| CN | 113065728 A | | 7/2021 | |
| EP | 1194862 A1 | | 4/2002 | |
| EP | 2698966 B1 | | 5/2017 | |
| EP | 3189690 A1 | | 7/2017 | |
| EP | 3267389 A1 | | 1/2018 | |
| EP | 3340133 A1 | | 6/2018 | |
| EP | 3769314 A1 | | 1/2021 | |
| EP | 3788639 A1 | | 3/2021 | |
| EP | 3841537 A1 | | 6/2021 | |
| JP | 2017526074 A | | 9/2017 | |
| KR | 101640867 B1 | | 7/2016 | |
| KR | 101812777 B1 | | 1/2018 | |
| KR | 20200039852 A | | 4/2020 | |
| KR | 102116824 B1 | | 6/2020 | |
| WO | 2008063815 A2 | | 5/2008 | |
| WO | 2013036677 A1 | | 3/2013 | |
| WO | 2015109249 A1 | | 7/2015 | |
| WO | 2018055506 A1 | | 3/2018 | |
| WO | 2018140975 A1 | | 8/2018 | |
| WO | 2018195058 A1 | | 10/2018 | |
| WO | 2018209174 A2 | | 11/2018 | |
| WO | 2019018732 A1 | | 1/2019 | |
| WO | 2019060878 A1 | | 3/2019 | |
| WO | 2019143412 A1 | | 7/2019 | |
| WO | 2019190368 A1 | | 10/2019 | |
| WO | 2020080819 A1 | | 4/2020 | |
| WO | WO-2020068141 A1 | * | 4/2020 | G06N 20/00 |
| WO | 2020141319 A1 | | 7/2020 | |
| WO | 2020161504 A1 | | 8/2020 | |
| WO | 2020234902 A1 | | 11/2020 | |
| WO | 2020257782 A1 | | 12/2020 | |
| WO | 2020257784 A1 | | 12/2020 | |
| WO | 2021028442 A1 | | 2/2021 | |
| WO | 2021028463 A1 | | 2/2021 | |
| WO | 2021127566 A1 | | 6/2021 | |
| WO | 2021137100 A1 | | 7/2021 | |

\* cited by examiner

ALGORITHM SELECTOR FOR PROFILING APPLICATION USAGE BASED ON NETWORK SIGNALS

BACKGROUND

There has been a dramatic increase in the proliferation of smart devices, and related applications have emerged significantly in people's daily life. As such, understanding the pattern of application usage and related online behavior is of great importance for a variety of purposes, such as application engineering, resource optimization, and commercial applications. For example, application profiling is important because businesses can utilize application usage data to create targeted products. Thus, the better the underlying application usage data, the better (and more valuable) the end-product. Existing techniques of application usage discovery includes surveys from end-users, application provider-related analysis, and usage log mining. These techniques, however, suffer from limitations, such as insufficient coverage and sample bias. Application usage classification methods have been extensively researched, with a common understanding that detecting individual application packets is not an easy task. Deep packet inspection (DPI) is useful in this context, however, computational cost limits wide adoption.

The onset of 5G wireless communications brings about even greater challenges to detecting application usage, given the numerous different types of connected devices and applications that provide ultrahigh-speed service delivery. For example, 5G networks support massively interconnected Internet-of-Things (IOT), mobile broadband (MBB), vehicle-to-everything (V2X), machine-to-machine (M2M), machine-to-everything (M2X), ultra-reliable low latency communication (URLLC), machine-type communication (MTC), and the like. 5G-powered mobile apps allow users access to progressive technologies such as IoT, UltraHD videos, cloud computing, Augmented and Virtual Reality (ARNR) applications, etc. As such, the existing challenges of application profiling are exacerbated with the expansion of 5G technology, yet the desire for understanding application usage is even greater given the more expansive audience that is immersed in applications running on different interconnected devices.

BRIEF DESCRIPTION OF THE DRAWINGS

Detailed descriptions of implementations of the present invention will be described and explained through the use of the accompanying drawings.

The technologies described herein will become more apparent to those skilled in the art from studying the Detailed Description in conjunction with the drawings. Embodiments or implementations describing aspects of the invention are illustrated by way of example, and the same references can indicate similar elements. While the drawings depict various implementations for the purpose of illustration, those skilled in the art will recognize that alternative implementations can be employed without departing from the principles of the present technologies. Accordingly, while specific implementations are shown in the drawings, the technology is amenable to various modifications.

DETAILED DESCRIPTION

The disclosed technology includes a technique for profiling an application program (also referred to herein as an "application" or "app") running on a wireless device, based on signals such as Server Name Indication (SNI) signals the app exchanges over a wireless network. In one example, a method includes selecting a best predictive algorithm (e.g., a Machine Learning (ML) algorithm) for predicting that the source of network signals corresponds to a particular application. An application profile describes one or more network signals, or a pattern of network signals, and designates the best algorithm for predicting the application based on the network signals. The profile is stored in a database along with other profiles and best algorithms for predicting respective applications. When network signals from user devices are subsequently captured and analyzed, the designated best ML algorithms of the profiles having sufficiently matching network signals can be used to predict application usage including installs or utilization. As such, for example, the popularity of a particular application or relationships among applications on user devices can be understood for managing resources and for commercial purposes (e.g., to target products).

Accompanying benefits of the disclosed technology include dynamic allocation of network resources to optimize network performance based on application profiling data. That is, network resources can be dynamically allocated based on which applications are being used on specific devices. For example, if a wireless carrier determines that a device is using an app for streaming videos (e.g., on YouTube®), the carrier can designate an optimal bandwidth for that device to stream videos. If the network carrier determines that another device is using a music streaming app (e.g., Spotify®), the wireless carrier can provide the optimal bandwidth for that device, which would be lower than for the streaming video app. As such, the total bandwidth available from a network access node to devices is optimally utilized, which also improves the experience of users of the wireless network. In yet another example, the network carrier can use the app profiling data to predict network loads in the future and dynamically adjust network resources to optimize performance accordingly.

An aspect of the disclosed technology includes an algorithm selector that identifies an algorithm, from among multiple algorithms, that most reliably ("best") predicts an application based on network signals. The best algorithm is identified based on the strength of its prediction relative to the predictions of other algorithms. In one example, an unknown mobile app on a mobile device can generate a SNI signal sent over a communications network to connect to a host server. The network signals stored in a database can map to known mobile apps and designate respective best algorithms for predicting whether the SNI signal is of, or associated with, a particular mobile app. The database can also store other data including host server identifiers, identifiers of anonymized user devices that use certain mobile app, duration of usage, and the like to perform analytics that provide greater insights into application usage.

Another aspect of the disclosed technology includes the ability to monitor application activity based on the installs or utilization of applications that were predicted based on the messages processed with designated best algorithms. The resulting information is particularly valuable to brands or agencies that utilize mobile apps to attract customers. For example, data indicating customer usage of a coffee store application can be important to the coffee store, as well as competitors, by giving insight into customer related information such as locations or typical time of the day when an application is used, other mobile apps used by the same user device (e.g., indicates other commercial interests), etc.

The disclosed embodiments evolve over a "one-size-fits-all" algorithm approach where all network signals would be processed using the same algorithm to predict applications that generated the network signals. The results of that approach can include confidence scores that indicate a level of confidence for each prediction. The "one-size-fits-all" algorithm approach has drawbacks including that the accuracy of predictive algorithms vary for different input signals. As such, using one algorithm to process all network signals results in unreliable outputs.

The disclosed technology takes advantage of a variety of predictive algorithms to create a model selector that employs numerous available algorithms to identify algorithms that describe and match the relationship between network signals and applications most accurately. Moving away from a "one-size-fits-all" approach, a best predictive algorithm can be selected for one application while another best predictive algorithm can be selected for another application. The "best" algorithm is determined by processing network signals of an application through all available algorithms. The algorithm with the highest accuracy score for the application or network signals is designated as such to process network signals.

The disclosed technology also addresses the problem that network signals for the same or similar applications do not always match exactly. For example, different SNI signals can be generated by an application that is in focus on the device, a web-browser version of the application, or application running in the background without the user application being in the foreground on the device. A best predictive algorithm can predict a relationship between any of these detected network signals and the same application even if the network signals (or pattern thereof) are not necessarily the same.

In one example, the same SNIs are triggered in all the following scenarios: the application being used, the web-browser version of the application being used, and the application running in the background. The ML model can distinguish between when the application is actually being used and any other scenario where that same SNI is communicated over the wireless network. This is achieved by looking at the amount of data uploaded and downloaded over that SNI, and the combination of other SNIs relevant to that application that were communicated by that device.

Thus, the disclosed technology improves the effectiveness and accuracy of predictions for application profiling. In addition, the algorithms designated for application profiles can be refreshed to ensure that the most accurate predictions are being made. In one example, an algorithm selector can refresh a profile after every major update to an associated application. In another example, the algorithm selector can refresh the database of profiles periodically (e.g., every month) or on demand in response to application updates.

The description and associated drawings are illustrative examples and are not to be construed as limiting. This disclosure provides certain details for a thorough understanding and enabling description of these examples. One skilled in the relevant technology will understand, however, that the invention can be practiced without many of these details. Likewise, one skilled in the relevant technology will understand that the invention can include well-known structures or features that are not shown or described in detail, to avoid unnecessarily obscuring the descriptions of examples.

Wireless Communications System

Figure 1:
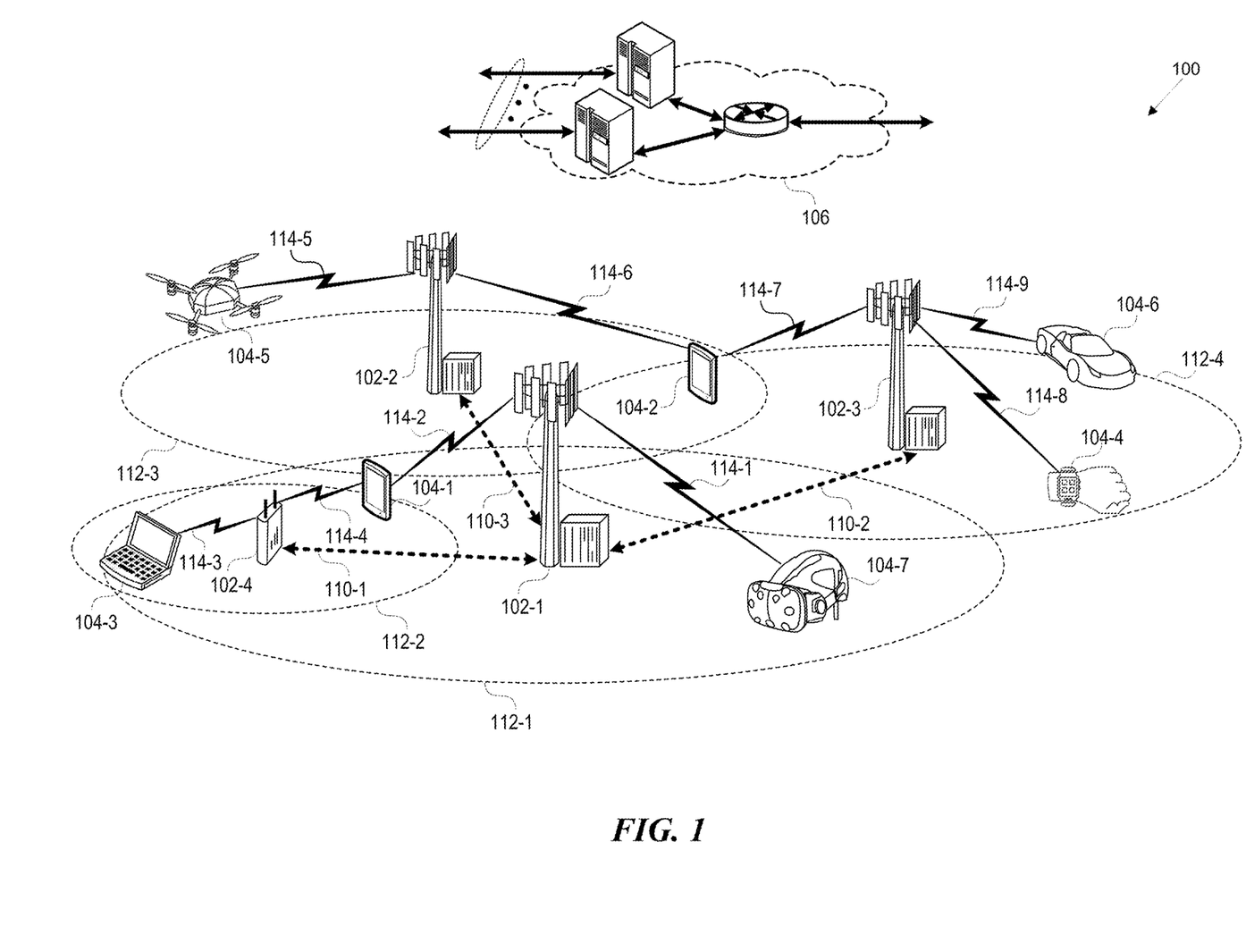
FIG. 1 is a block diagram that illustrates a wireless communications system in which at least some operations described herein can be implemented.

FIG. 1 is a block diagram that illustrates a wireless telecommunication network 100 ("network 100") in which aspects of the disclosed technology are incorporated. The network 100 includes base stations 102-1 through 102-4 (also referred to individually as "base station 102" or collectively as "base stations 102"). A base station is a type of network access node (NAN) that can also be referred to as a cell site, a base transceiver station, or a radio base station. The network 100 can include any combination of NANs including an access point, radio transceiver, gNodeB (gNB), NodeB, eNodeB (eNB), Home NodeB or Home eNodeB, or the like. In addition to being a wireless wide area network (WVAN) base station, a NAN can be a wireless local area network (WLAN) access point, such as an Institute of Electrical and Electronics Engineers (IEEE) 802.11 access point.

The NANs of a network 100 formed by the network 100 also include wireless devices 104-1 through 104-7 (referred to individually as "wireless device 104" or collectively as "wireless devices 104") and a core network 106. The wireless devices 104-1 through 104-7 can correspond to or include network 100 entities capable of communication using various connectivity standards. For example, a 5G communication channel can use millimeter wave (mmW) access frequencies of 28 GHz or more. In some implementations, the wireless device 104 can operatively couple to a base station 102 over a long-term evolution/long-term evolution-advanced (LTE/LTE-A) communication channel, which is referred to as a 4G communication channel.

The core network 106 provides, manages, and controls security services, user authentication, access authorization, tracking, Internet Protocol (IP) connectivity, and other access, routing, or mobility functions. The base stations 102 interface with the core network 106 through a first set of backhaul links (e.g., S1 interfaces) and can perform radio configuration and scheduling for communication with the wireless devices 104 or can operate under the control of a base station controller (not shown). In some examples, the base stations 102 can communicate with each other, either directly or indirectly (e.g., through the core network 106), over a second set of backhaul links 110-1 through 110-3 (e.g., X1 interfaces), which can be wired or wireless communication links.

The base stations 102 can wirelessly communicate with the wireless devices 104 via one or more base station antennas. The cell sites can provide communication coverage for geographic coverage areas 112-1 through 112-4 (also referred to individually as "coverage area 112" or collectively as "coverage areas 112"). The geographic coverage area 112 for a base station 102 can be divided into sectors making up only a portion of the coverage area (not shown). The network 100 can include base stations of different types (e.g., macro and/or small cell base stations). In some implementations, there can be overlapping geographic coverage areas 112 for different service environments (e.g., Internet-of-Things (IoT), mobile broadband (MBB), vehicle-to-everything (V2X), machine-to-machine (M2M), machine-to-everything (M2X), ultra-reliable low-latency communication (URLLC), machine-type communication (MTC), etc.).

The network 100 can include a 5G network 100 and/or an LTE/LTE-A or other network. In an LTE/LTE-A network, the term eNB is used to describe the base stations 102, and in 5G new radio (NR) networks, the term gNBs is used to describe the base stations 102 that can include mmW communications. The network 100 can thus form a heterogeneous network 100 in which different types of base stations provide coverage for various geographic regions. For example, each base station 102 can provide communication coverage for a macro cell, a small cell, and/or other types of cells. As used herein, the term "cell" can relate to a base station, a carrier or component carrier associated with the base station, or a coverage area (e.g., sector) of a carrier or base station, depending on context.

A macro cell generally covers a relatively large geographic area (e.g., several kilometers in radius) and can allow access by wireless devices that have service subscriptions with a wireless network 100 service provider. As indicated earlier, a small cell is a lower-powered base station, as compared to a macro cell, and can operate in the same or different (e.g., licensed, unlicensed) frequency bands as macro cells. Examples of small cells include pico cells, femto cells, and micro cells. In general, a pico cell can cover a relatively smaller geographic area and can allow unrestricted access by wireless devices that have service subscriptions with the network 100 provider. A femto cell covers a relatively smaller geographic area (e.g., a home) and can provide restricted access by wireless devices having an association with the femto unit (e.g., wireless devices in a closed subscriber group (CSG), wireless devices for users in the home). A base station can support one or multiple (e.g., two, three, four, and the like) cells (e.g., component carriers). All fixed transceivers noted herein that can provide access to the network 100 are NANs, including small cells.

The communication networks that accommodate various disclosed examples can be packet-based networks that operate according to a layered protocol stack. In the user plane, communications at the bearer or Packet Data Convergence Protocol (PDCP) layer can be IP-based. A Radio Link Control (RLC) layer then performs packet segmentation and reassembly to communicate over logical channels. A Medium Access Control (MAC) layer can perform priority handling and multiplexing of logical channels into transport channels. The MAC layer can also use Hybrid ARQ (HARQ) to provide retransmission at the MAC layer, to improve link efficiency. In the control plane, the Radio Resource Control (RRC) protocol layer provides establishment, configuration, and maintenance of an RRC connection between a wireless device 104 and the base stations 102 or core network 106 supporting radio bearers for the user plane data. At the Physical (PHY) layer, the transport channels are mapped to physical channels.

Wireless devices can be integrated with or embedded in other devices. As illustrated, the wireless devices 104 are distributed throughout the wireless telecommunication network 100, where each wireless device 104 can be stationary or mobile. For example, wireless devices can include handheld mobile devices 104-1 and 104-2 (e.g., smartphones, portable hotspots, tablets, etc.); laptops 104-3; wearables 104-4; drones 104-5; vehicles with wireless connectivity 104-6; head-mounted displays with wireless augmented reality/virtual reality (ARNR) connectivity 104-7; portable gaming consoles; wireless routers, gateways, modems, and other fixed-wireless access devices; wirelessly connected sensors that provides data to a remote server over a network; IoT devices such as wirelessly connected smart home appliances, etc.

A wireless device (e.g., wireless devices 104-1, 104-2, 104-3, 104-4, 104-5, 104-6, and 104-7) can be referred to as a user equipment (UE), a customer premise equipment (CPE), a mobile station, a subscriber station, a mobile unit, a subscriber unit, a wireless unit, a remote unit, a handheld mobile device, a remote device, a mobile subscriber station, terminal equipment, an access terminal, a mobile terminal, a wireless terminal, a remote terminal, a handset, a mobile client, a client, or the like.

A wireless device can communicate with various types of base stations and network 100 equipment at the edge of a network 100 including macro eNBs/gNBs, small cell eNBs/gNBs, relay base stations, and the like. A wireless device can also communicate with other wireless devices either within or outside the same coverage area of a base station via device-to-device (D2D) communications.

The communication links 114-1 through 114-9 (also referred to individually as "communication link 114" or collectively as "communication links 114") shown in network 100 include uplink (UL) transmissions from a wireless device 104 to a base station 102, and/or downlink (DL) transmissions from a base station 102 to a wireless device 104. The downlink transmissions can also be called forward link transmissions while the uplink transmissions can also be called reverse link transmissions. Each communication link 114 includes one or more carriers, where each carrier can be a signal composed of multiple sub-carriers (e.g., waveform signals of different frequencies) modulated according to the various radio technologies. Each modulated signal can be sent on a different sub-carrier and carry control information (e.g., reference signals, control channels), overhead information, user data, etc. The communication links 114 can transmit bidirectional communications using frequency division duplex (FDD) (e.g., using paired spectrum resources) or Time division duplex (TDD) operation (e.g., using unpaired spectrum resources). In some implementations, the communication links 114 include LTE and/or mmW communication links.

In some implementations of the network 100, the base stations 102 and/or the wireless devices 104 include multiple antennas for employing antenna diversity schemes to improve communication quality and reliability between base stations 102 and wireless devices 104. Additionally or alternatively, the base stations 102 and/or the wireless devices 104 can employ multiple-input, multiple-output (MIMO) techniques that can take advantage of multi-path environments to transmit multiple spatial layers carrying the same or different coded data.

System for Application Profiling

Figure 2:
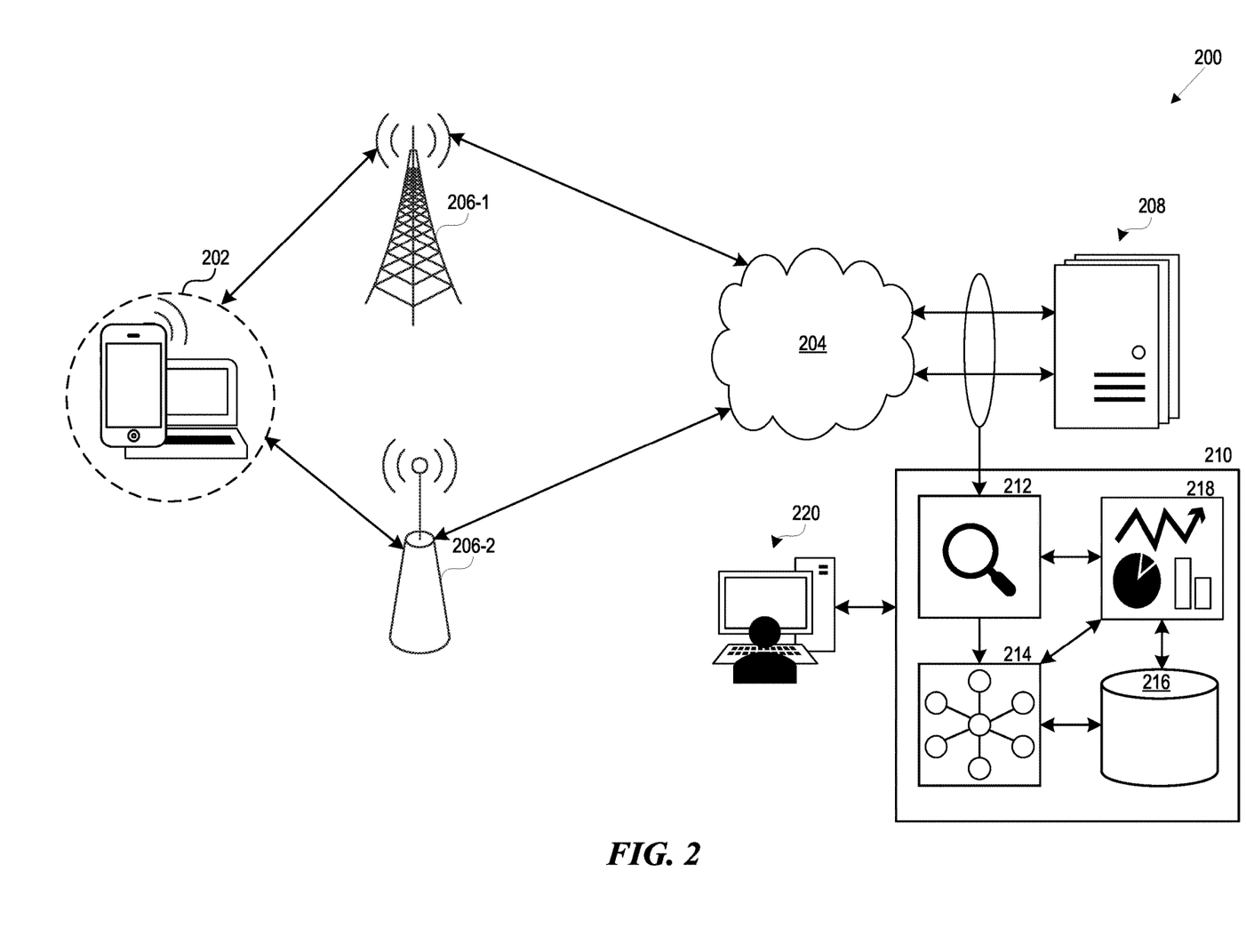
FIG. 2 is a block diagram that illustrates a system including an application profiler that selects a best algorithm to accurately predict an application program ("application") based on network signals.

FIG. 2 is a block diagram that illustrates a system including an application profiler that selects a best algorithm to accurately predict an application program based on network signals. In one example, the system can predict applications that are utilized by user devices. The predictions are generated as outputs of selected algorithms based on inputs including network signals that are captured on the network. The network signals (or pattern thereof) are profiled to map to a particular application.

The captured network signals can include SNI signals. A SNI signal can "indicate" a hostname or domain name, which can be separate from the name of the underlying server. As such, it is not uncommon for multiple domains to be hosted on one server. More specifically, SNI signal is an extension to the Transport Layer Security (TLS) computer networking protocol by which a user device indicates which hostname it is attempting to connect to at the start of a handshaking process. The desired hostname is typically not encrypted in the SNI signal such that it can be extracted to see which site is being requested, even though other parts of the signal or data transmission may be encrypted. For an application program to generate SNI signals, the TLS library it uses must implement it and the application must pass the hostname to the TLS library. The TLS library may either be included in the application or be a component of the underlying operating system.

The system 200 includes user devices 202 that are communicatively coupled to one or more networks including network 204 via network access nodes 206-1 and 206-2 (referred to collectively as "network access nodes 206"). The user devices 202 include applications that can generate network signals to connect to or communicate with the host servers 208. The system 200 shows different types of wireless access nodes 206 to illustrate that the user devices 202 can access the host servers 208 through different types of network access nodes over the network 204. The network 204 can include any combination of private, public, wired, or wireless systems such as a cellular network, a computer network, the Internet, and the like. Any data communicated over the network 204 can be encrypted or unencrypted at various locations or along different portions of the networks.

The system 200 further includes an application profiler 210 that has various components (e.g., modules). In general, the profiler 210 can translate network signals (or patterns thereof) into insights regarding application usage. In particular, the profiler can select from among multiple different algorithms to use for predicting that network signals are of a particular application. The profiler 210 chooses the algorithm with the highest accuracy for predicting a particular application based on a profile of network signals and designates that algorithm as the best algorithm. The profiler 210 is scalable to continuously process a stream of network signals and produce reliable results. The resulting application usage data can be used to target products or fed to partnering systems in real-time for timely commercial activity.

The illustrated components include a monitor 212 that is configured to capture network signals, an algorithm selector 214 that is configured to select best algorithms for predicting applications based on network signals, a database 216 that is configured to store profiles that map to best algorithms for predicting applications based on network signals, an application usage analyzer 218 configured to enable continuous iterative exploration and investigation of application usage. The components can include combinations of hardware and/or software to process network signals, perform functions, communicate over the network 204, etc. For example, components can include servers having processors, memory, transceivers, operating systems, applications, and the like. The system 200 also illustrates an analyst device 220 that can access the components of the profiler 210.

The monitor 212 implements processes for extracting network signals and discovering patterns of network signals. In some embodiments, the monitor 212 can classify network signals based on patterns including a frequency and quantity of network signals. The mining performed by the monitor 212 has an overall goal of extracting network signals for translation by selected algorithms into predicted applications. In one example, SNI signals that are communicated for the host servers 208 are captured and used to determine application usage. The monitor 212 can use network signal aggregation, pre-processing, and post-processing to optimize processing by other components or for storing in the database 216. In one implementation, the algorithms process selected SNIs, analyze communications of those SNIs from a specific device, and determine whether and for how long the application was used by that device. For example, the system can analyze all the SNIs communicated over the course of a day for the specific device and then determine whether the application was used. This aggregation could be performed for a time period such as per hour or week, or not specific to a certain time period.

The database 216 can store profiles for thousands of applications and including network signals and designated best algorithms. As such, network signals that are detected on the network 204 are processed by the best algorithm to determine whether the network signals indicate that user devices are using the predicted application. By building profiles based on network signals, the network can detect network activity including application usage and information associated with the user devices on which the applications reside.

The performance of the profiler 210 depends on its ability to accurately predict applications based on network signals, which largely depends on the predictive algorithm that is used for processing the network signals. The algorithm selector 214 selects a best predictive algorithm based on how accurately that algorithm can predict an application from one or more network signals. In one example, one or more network signals of a known application are processed through each of multiple predictive algorithms. As such, the algorithms are trained to predict the application. The resulting predictions are scored based on their accuracy and the application with the strongest score is deemed to provide the greatest confidence in predicting the usage of the application accurately. The highest ranked algorithm is designated as the best algorithm for predicting the application.

In general, the predictive algorithms that are selected by the algorithm selector 214 are trained to recognize patterns in network signals. In one example, an ML model is trained based on one signal set, which provides the basis for the ML model to make a prediction about patterns in another signal set. In one implementation, the training data for the ML models are obtained from a relatively small subset of consenting network subscribers (e.g., 5-10%), with a software development toolkit (SDK) that is installed on their devices. The SDK collects a "truth" dataset for the system (e.g., the training dataset), including exactly which applications were used by which devices and for how long. The SNIs that are relevant to each application are determined by joining the training dataset to the SNI dataset, and the predictive algorithms are trained to predict what is seen in the training dataset. Hence, the "best" model can be selected based on which predictive algorithm produces outputs most like those seen in the training dataset.

A predictive algorithm can improve automatically by learning from the signal set that it processes to make predictions. There are at least four types of predictive algorithms: supervised, semi-supervised, unsupervised, and reinforcement. In supervised learning, an operator provides the algorithm with a known dataset that includes desired inputs and outputs, and the algorithm finds a method to determine how to arrive at those inputs and outputs. The algorithm makes predictions and is corrected by the operator, and this process continues until the algorithm achieves a high level of accuracy. Semi-supervised learning is similar to supervised learning, but instead uses both labeled and unlabeled data. By using this combination, the algorithm can learn to label the unlabeled data.

In unsupervised learning, there is no answer key or human operator to provide instructions. Instead, the algorithm determines correlations and relationships by analyzing available data. The algorithm tries to organize that data in some way to describe its structure. This might mean grouping the data into clusters or arranging it in a way that looks more organized.

In reinforcement learning, the algorithm is provided with a set of actions, parameters and end values. By defining the rules, the algorithm then tries to explore different options and possibilities, monitoring and evaluating each result to determine which one is optimal. Hence, reinforcement learning teaches the machine trial and error. It learns from past experiences and begins to adapt its approach in response to the situation to achieve the best possible result.

The following are examples of common and popular predictive algorithms, which could be used for profiling network signals. The Naïve Bayes classifier is based on Bayes' theorem and classifies every value as independent of any other value. It implements supervised learning and allows prediction of a class/category, based on a given set of features, using probability. The K Means Clustering algorithm is a type of unsupervised learning, which is used to categorize unlabeled data. The algorithm works by finding groups within the data, with the number of groups represented by the variable K. It then works iteratively to assign each data point to one of K groups based on the features provided.

Support Vector Machine algorithms are supervised learning models that analyze data used for classification and regression analysis. They essentially filter data into categories, which is achieved by providing a set of training examples, each set marked as belonging to one or the other of the two categories. The algorithm then works to build a model that assigns new values to one category or the other.

Linear regression is the most basic type of regression using supervised learning. Simple linear regression allows one to understand the relationships between two continuous variables. In contrast, logistic regression is supervised learning that focuses on estimating the probability of an event occurring based on the previous data provided. It is used to cover a binary dependent variable, that is where only two values, 0 and 1, represent outcomes.

An artificial neural network (ANN) uses reinforcement Learning comprises 'units' arranged in a series of layers, each of which connects to layers on either side. ANNs are essentially a large number of interconnected processing elements, working in unison to solve specific problems. ANNs also learn by example and through experience, and they are extremely useful for modelling non-linear relationships in high-dimensional data or where the relationship amongst the input variables is difficult to understand.

A decision tree uses supervised learning in a flow-chart-like tree structure that uses a branching method to illustrate every possible outcome of a decision. Each node within the tree represents a test on a specific variable—and each branch is the outcome of that test. In contrast, random forests or 'random decision forests' is an ensemble supervised learning method, combining multiple algorithms to generate better results for classification, regression and other tasks. The K-Nearest-Neighbor algorithm is a supervised learning algorithm that estimates how likely a data point is to be a member of one group or another. It essentially looks at the data points around a single data point to determine in which group the data points belong.

Ensemble methods use multiple learning algorithms to obtain better predictive performance than could be obtained from any of the constituent learning algorithms alone. A machine learning ensemble consists of a concrete finite set of alternative models but can allow for much more flexible structure to exist among those alternatives. In one example, gradient boosting gives a prediction model in the form of an ensemble of weak prediction models, which are typically decision trees. When a decision tree is the weak learner, the resulting algorithm is called gradient-boosted trees. A gradient-boosted trees model is built in a stage-wise fashion as in other boosting methods, but it generalizes the other methods by allowing optimization of an arbitrary differentiable loss function.

The analyzer 218 can use statistical methods to form a data-driven understanding of application usage. The analyzer 218 makes extensive use of tools and analytical modeling and numerical analysis, including explanatory and predictive modeling, as well as fact-based management to drive decision-making. For example, the analyzer 218 can quantify application usage per application or per user device and classify heavy users or light users.

The analyzer 218 can generate insights including whether one application is associated with another application that is stored or used on the same user device, how many user devices on the network maintain a particular application, how often the particular application is used, etc. This information can be used by businesses to target products for the user devices that utilize the particular application. For example, the insights can be used to determine whether user devices that regularly utilize news applications often have coffee shop applications. As such, the news applications can sell ad space to the coffee shop to embed ads in the news content of the news applications. In another example, user devices are anonymously linked to applications so that the network can monitor the activity of a particular application per device.

The analyst device 220 includes any user device that is operable by authorized users to access components of the profiler 210. In one example, users of the analyst device 220 are assigned roles that grant access to one, any, or all components of the profiler 210. For example, a user with a reviewer role is only granted access to the analyzer 218 whereas a user with an administrator role is granted access to all components of the profiler 210 to, for example modify the algorithm selector 214 or modify how signal sets are aggregated by the monitor 212.

Figure 3:
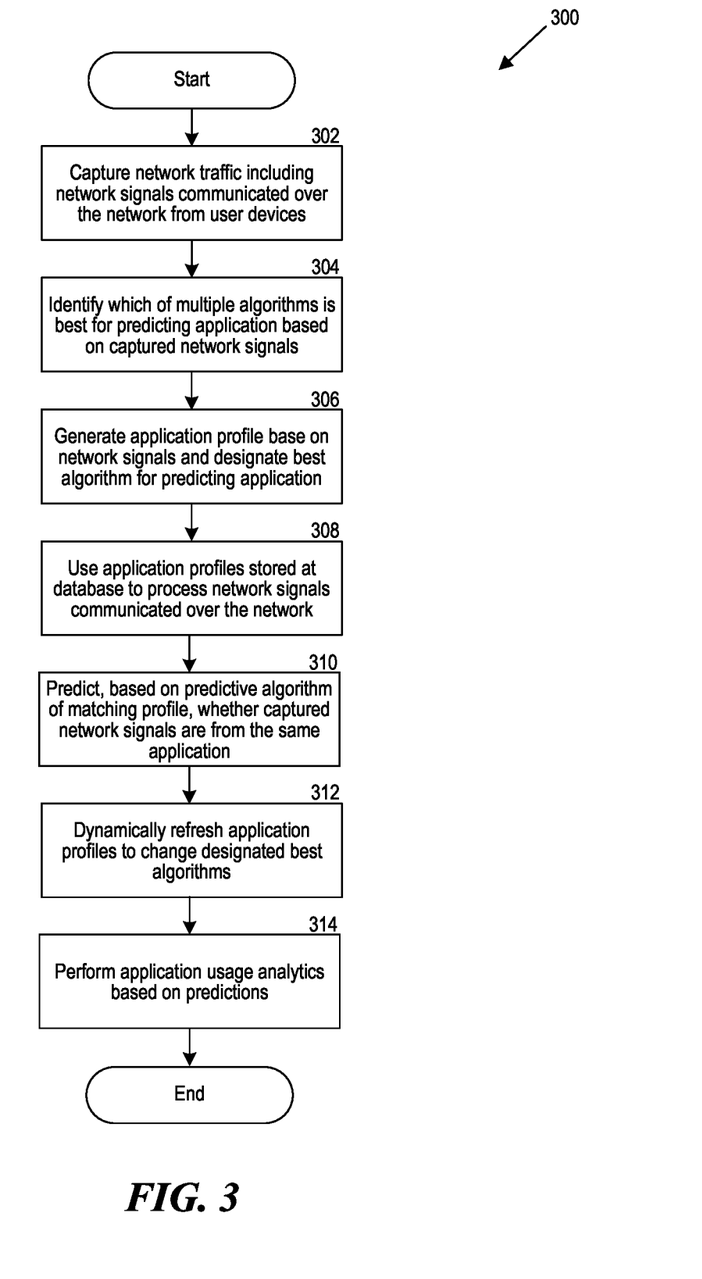
FIG. 3 is a flowchart that illustrates processes for selecting an algorithm and predicting an application based on network signals processed with the selected algorithm.

FIG. 3 is a flowchart that illustrates processes 300 for selecting an algorithm and predicting an application based on network signals processed with the selected algorithm. The processes 300 can be performed by a system including one or more nodes of a communications network or as a service accessible to the network.

At 302, the system captures network traffic communicated over the network from user devices. The network traffic includes network signals that are encrypted or unencrypted. The network signals indicate hosts to which user devices seek to connect. In one example, network signals include SNI signals of applications that seek to establish connections with host servers. Thus, the network signals are generated to connect to servers that can host or support applications that reside on the user devices. The source of the network signals can also include a web browser, operating system, and/or SDKs running on a device, the app store, etc. Hence, the disclosed technology can determine broadly whether SNIs are of applications or not (e.g., from other sources).

An application on the user device can be in-focus or running in the background. The network signals for the same application can vary. For example, SNI signals that are generated by an application can vary from SNI signals that are generated by a web-browser version of the application, which can vary from SNI signals that are generated by an application running in the background. In another example, the SNI signals that are generated by an application, a web-browser version of the application, or a background application could be the same but have a different pattern.

At 304, the system identifies which of multiple algorithms is best for predicting a particular application based on the captured network signals. For example, the system can process the network signals serially with each of multiple predictive algorithms to generate a score indicative of an accuracy for predicting the application, assuming that the application is a known training application. In one example, the system can identify two best predictive algorithms that have distinguishing features including a classifier algorithm configured to predict whether an application is utilized by the wireless user device and identify a regression algorithm configured to predict a duration that the application was utilized by the wireless user device. Hence, for each application, there could be two ML models that are selected: one "classifier" model, that classifies whether or not an app was used, and one "regression" model that predicts for how long the app was used. In one implementation, the system can rank each of the multiple algorithms based on a respective score for predicting the application per category (e.g., best classifier algorithm, best regression algorithm). The higher ranked algorithms provide greater confidence of predicting the application compared to lower ranked algorithms. The system would select a highest ranked algorithm as the best algorithm for the profiled application.

Examples of the algorithms include a naïve bayes classifier algorithm, a support vector machine algorithm, a linear regression algorithm, a logistic regression algorithm, an artificial neural networks algorithm, a decision trees algorithm, a random forests algorithm, a nearest neighbors algorithm, and an ensemble methods algorithm. A pattern of SNI signals is processed with each algorithm to output a respective score. Each score indicates a confidence value that an algorithm accurately predicted usage of the application based on the pattern of SNI signals.

At 306, the system generates an application profile base on the network signals and designates the best algorithm for accurately predicting the application. The application profile may include numerous and different network signals. The system can generate numerous application profiles based on network signals and designate a single preferred algorithm for each profile. The preferred algorithm is the best algorithm that provides the most accurate predictions. The system can dynamically select a best algorithm after retraining the algorithms with newer network signals. In one example, the system stores an indication of the best algorithm for a particular application profile at a database, where each profile can map to a best algorithm for accurately predicting an associated application.

At 308, the system uses the application profiles stored at the database to process other network signals communicated over the network. An application profile with sufficiently matching network signals is identified and designated best algorithm is used to process the network signals. The matching profile may not have all network signals that are identical to the captured network signals but are sufficiently correlated to decide that there is a "match." In one example, each ML model has a list of relevant SNIs that correspond to the application that the model is attempting to classify. If at least 1 of the SNIs in a particular ML model is communicated by a device, then the particular model is used for processing. That is, a threshold amount of matching (e.g., 1 or more, 50% or more) of the network signals with an existing application profile can trigger concluding that the designated best algorithm for the identified matching profile should be used to process the network signals. The threshold can be adjusted as desired such as for obtaining a desired accuracy.

At 310, the system predicts, based on the predictive algorithm of the matching profile, whether the network signals captured in the network traffic are from the same application designated by the matching profile. For example, the system can use the best algorithm for a matching profile to predict whether a SNI signal is for the same application. The algorithms predict whether or not an application was actually focused on based on the usage of network signals that are "relevant" to that application.

At 312, the system can dynamically refresh application profiles to change the designated best algorithms. For example, the system can periodically process new or changed network signals through each of the multiple algorithms and determine whether a different algorithm is now the best for predicting an application. Doing so is necessary when network signals can change due to, for example, application updates. As such, the system can dynamically replace an algorithm having a lower accuracy with another algorithm having a higher accuracy for predicting an application. The profiles can be refreshed periodically or in response to a change to the network signals or the corresponding application (e.g., a newer version is released).

At 314, the system can perform application usage analytics from the predictions based on captured network signals. For example, the system can monitor a quantity of installs and/or utilization of one or more applications based on captured network signals that are processed with the selected predictive algorithms. As such, the system can estimate the popularity of a particular application, relationships among applications, and/or other data on user devices. This information can be used to manage the network or for commercial purposes. For example, coffee ads can be targeted for user devices that own or regularly use a coffee shop application. The system can build personas based on app usage. The personas can include demographic data, life stage (e.g., "parents"), shopping intentions (e.g., "in market for a car/home"), etc. The system can use the personas to serve targeted ads or show insights about users of a specific application or set of applications, or any set of people.

The system can estimate different metrics for application usage based on the predictions of the algorithms. For example, the system can estimate utilization of a particular application based on the frequency of capturing associated network signals. The system can estimate measures of utilization including frequency or duration. In another example, the system infers the popularity of a particular application based on a quantity of network signals that are detected for the particular application, as predicted by the system. The system can estimate measures of popularity including a quantity of installs of a particular application across the multiple user devices. The system can also independently or collectively monitor ongoing utilization of one or more applications on one or more user devices to determine trends in utilization. The system can also use location information of the user devices to estimate metrics such as location dependent peak utilization.

The system also enables ongoing monitoring per application and/or per device. For example, the system can obtain and anonymize an indication of a device, and store the anonymized indication in the database, which maps to the particular application. As such, the system can monitor an amount or frequency that the user device utilizes an application. The system can also predict relationships between two or more application programs based on a common utilization pattern. For example, the system can determine that a first predicted application and a second predicted application have a correlated utilization and then store an indication of the correlated utilization at the database. This information can be used to cross-sell products or services to users of the applications.

Computer System

Figure 4:
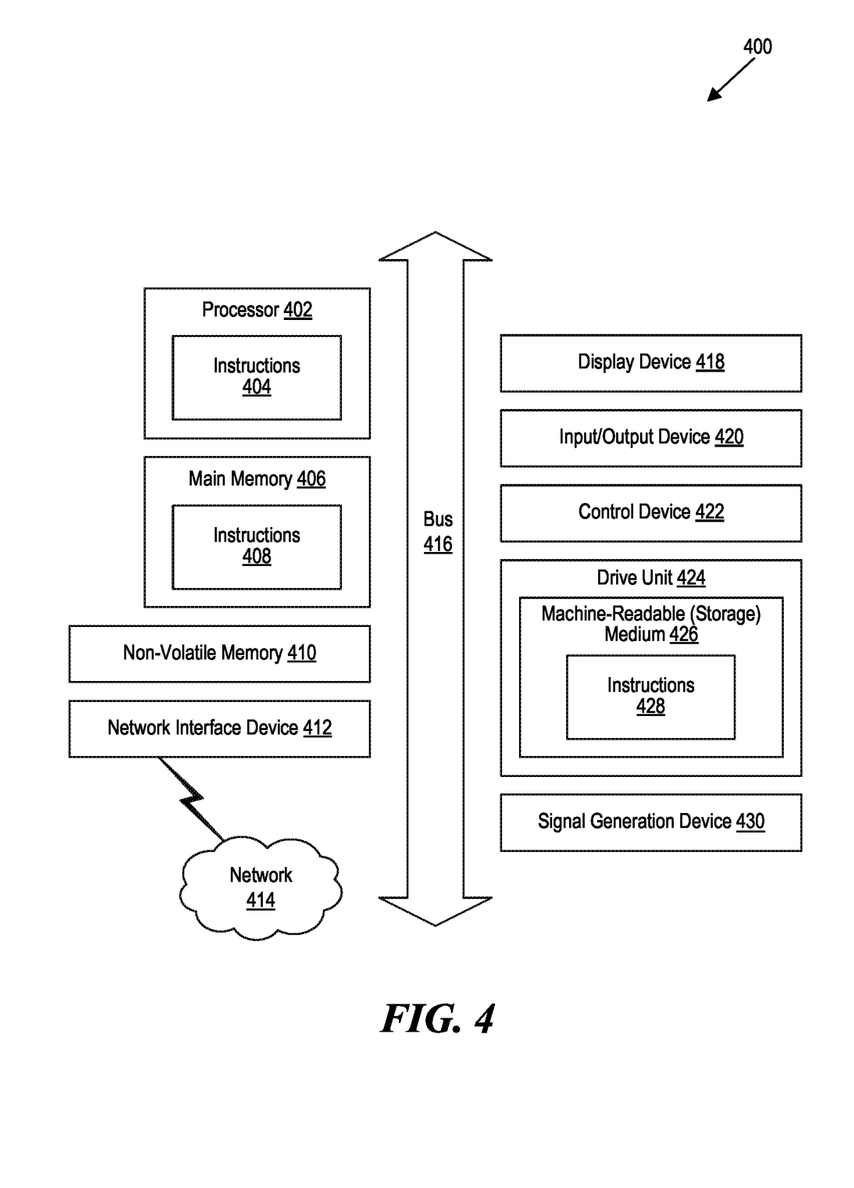
FIG. 4 is a block diagram that illustrates an example of a computer system in which at least some operations described herein can be implemented.

FIG. 4 is a block diagram that illustrates an example of a computer system 400 in which at least some operations described herein can be implemented. As shown, the computer system 400 can include: one or more processors 402, main memory 406, non-volatile memory 410, a network interface device 412, video display device 418, an input/output device 420, a control device 422 (e.g., keyboard and pointing device), a drive unit 424 that includes a storage medium 426, and a signal generation device 430 that are communicatively connected to a bus 416. The bus 416 represents one or more physical buses and/or point-to-point connections that are connected by appropriate bridges, adapters, or controllers. Various common components (e.g., cache memory) are omitted from FIG. 4 for brevity. Instead, the computer system 400 is intended to illustrate a hardware device on which components illustrated or described relative to the examples of the figures and any other components described in this specification can be implemented.

The computer system 400 can take any suitable physical form. For example, the computing system 400 can share a similar architecture as that of a server computer, personal computer (PC), tablet computer, mobile telephone, game console, music player, wearable electronic device, network-connected ("smart") device (e.g., a television or home assistant device), ARNR systems (e.g., head-mounted display), or any electronic device capable of executing a set of instructions that specify action(s) to be taken by the computing system 400. In some implementation, the computer system 400 can be an embedded computer system, a system-on-chip (SOC), a single-board computer system (SBC) or a distributed system such as a mesh of computer systems or include one or more cloud components in one or more networks. Where appropriate, one or more computer systems 400 can perform operations in real-time, near real-time, or in batch mode.

The network interface device 412 enables the computing system 400 to mediate data in a network 414 with an entity that is external to the computing system 400 through any communication protocol supported by the computing system 400 and the external entity. Examples of the network interface device 412 include a network adaptor card, a wireless network interface card, a router, an access point, a wireless router, a switch, a multilayer switch, a protocol converter, a gateway, a bridge, bridge router, a hub, a digital media receiver, and/or a repeater, as well as all wireless elements noted herein.

The memory (e.g., main memory 406, non-volatile memory 410, machine-readable medium 426) can be local, remote, or distributed. Although shown as a single medium, the machine-readable medium 426 can include multiple media (e.g., a centralized/distributed database and/or associated caches and servers) that store one or more sets of instructions 428. The machine-readable (storage) medium 426 can include any medium that is capable of storing, encoding, or carrying a set of instructions for execution by the computing system 400. The machine-readable medium 426 can be non-transitory or comprise a non-transitory device. In this context, a non-transitory storage medium can include a device that is tangible, meaning that the device has a concrete physical form, although the device can change its physical state. Thus, for example, non-transitory refers to a device remaining tangible despite this change in state.

Although implementations have been described in the context of fully functioning computing devices, the various examples are capable of being distributed as a program product in a variety of forms. Examples of machine-readable storage media, machine-readable media, or computer-readable media include recordable-type media such as volatile and non-volatile memory devices 410, removable flash memory, hard disk drives, optical disks, and transmission-type media such as digital and analog communication links.

In general, the routines executed to implement examples herein can be implemented as part of an operating system or a specific application, component, program, object, module, or sequence of instructions (collectively referred to as "computer programs"). The computer programs typically comprise one or more instructions (e.g., instructions 404, 408, 428) set at various times in various memory and storage devices in computing device(s). When read and executed by the processor 402, the instruction(s) cause the computing system 400 to perform operations to execute elements involving the various aspects of the disclosure.

Remarks

The terms "example", "embodiment" and "implementation" are used interchangeably. For example, reference to "one example" or "an example" in the disclosure can be, but not necessarily are, references to the same implementation; and, such references mean at least one of the implementations. The appearances of the phrase "in one example" are not necessarily all referring to the same example, nor are separate or alternative examples mutually exclusive of other examples. A feature, structure, or characteristic described in connection with an example can be included in another example of the disclosure. Moreover, various features are described which can be exhibited by some examples and not by others. Similarly, various requirements are described which can be requirements for some examples but no other examples.

The terminology used herein should be interpreted in its broadest reasonable manner, even though it is being used in conjunction with certain specific examples of the invention. The terms used in the disclosure generally have their ordinary meanings in the relevant technical art, within the context of the disclosure, and in the specific context where each term is used. A recital of alternative language or synonyms does not exclude the use of other synonyms. Special significance should not be placed upon whether or not a term is elaborated or discussed herein. The use of highlighting has no influence on the scope and meaning of a term. Further, it will be appreciated that the same thing can be said in more than one way.

Unless the context clearly requires otherwise, throughout the description and the claims, the words "comprise," "comprising," and the like are to be construed in an inclusive sense, as opposed to an exclusive or exhaustive sense; that is to say, in the sense of "including, but not limited to." As used herein, the terms "connected," "coupled," or any variant thereof means any connection or coupling, either direct or indirect, between two or more elements; the coupling or connection between the elements can be physical, logical, or a combination thereof. Additionally, the words "herein," "above," "below," and words of similar import can refer to this application as a whole and not to any particular portions of this application. Where context permits, words in the above Detailed Description using the singular or plural number may also include the plural or singular number respectively. The word "or" in reference to a list of two or more items covers all of the following interpretations of the word: any of the items in the list, all of the items in the list, and any combination of the items in the list. The term "module" refers broadly to software components, firmware components, and/or hardware components.

While specific examples of technology are described above for illustrative purposes, various equivalent modifications are possible within the scope of the invention, as those skilled in the relevant art will recognize. For example, while processes or blocks are presented in a given order, alternative implementations can perform routines having steps, or employ systems having blocks, in a different order, and some processes or blocks may be deleted, moved, added, subdivided, combined, and/or modified to provide alternative or sub-combinations. Each of these processes or blocks can be implemented in a variety of different ways. Also, while processes or blocks are at times shown as being performed in series, these processes or blocks can instead be performed or implemented in parallel, or can be performed at different times. Further, any specific numbers noted herein are only examples such that alternative implementations can employ differing values or ranges.

Details of the disclosed implementations can vary considerably in specific implementations while still being encompassed by the disclosed teachings. As noted above, particular terminology used when describing features or aspects of the invention should not be taken to imply that the terminology is being redefined herein to be restricted to any specific characteristics, features, or aspects of the invention with which that terminology is associated. In general, the terms used in the following claims should not be construed to limit the invention to the specific examples disclosed herein, unless the above Detailed Description explicitly defines such terms. Accordingly, the actual scope of the invention encompasses not only the disclosed examples, but also all equivalent ways of practicing or implementing the invention under the claims. Some alternative implementations can include additional elements to those implementations described above or include fewer elements.

Any patents and applications and other references noted above, and any that may be listed in accompanying filing papers, are incorporated herein by reference in their entireties, except for any subject matter disclaimers or disavowals, and except to the extent that the incorporated material is inconsistent with the express disclosure herein, in which case the language in this disclosure controls. Aspects of the invention can be modified to employ the systems, functions, and concepts of the various references described above to provide yet further implementations of the invention.

To reduce the number of claims, certain implementations are presented below in certain claim forms, but the applicant contemplates various aspects of an invention in other forms. For example, aspects of a claim can be recited in a means-plus-function form or in other forms, such as being embodied in a computer-readable medium. A claim intended to be interpreted as a mean-plus-function claim will use the words "means for." However, the use of the term "for" in any other context is not intended to invoke a similar interpretation. The applicant reserves the right to pursue such additional claim forms in either this application or in a continuing application.

The invention claimed is:

1. A computer-readable storage medium, excluding transitory signals and carrying instructions, which, when executed by at least one data processor of a system, cause the system to:

process Server Name Indication (SNI) signals of a first application, the processing performed with multiple different Machine Learning (ML) algorithms to output respective scores,
  wherein each score of the respective scores is indicative of a confidence that a respective ML algorithm of the multiple different ML algorithms accurately predicts the first application as a source of the SNI signals, and
  wherein the SNI signals of the first application are communicated by a first wireless user device over a wireless telecommunications network and indicates a host for the first application;
identify, based on each score of the respective scores, one or more best ML algorithm of the multiple different ML algorithms that provides increased confidence in predicting the first application as the source of the SNI signals based on the SNI signals of the first application;
store a first profile including a description of the SNI signals and an indication of the best ML algorithm for predicting the first application as the source of the SNI signals, wherein the first profile is maintained in a database that stores multiple profiles that relate SNI signals to best ML algorithms;
capture SNI signals communicated by a second wireless user device on the wireless telecommunications network;
based on the captured SNI signals, identify a matching profile from among the multiple profiles for processing the captured SNI signals; and
based on a second ML algorithm of the matching profile, predict that the captured SNI signals communicated from the second wireless device are sourced from a second application.

2. The computer-readable storage medium of claim 1, wherein the system is further caused to, prior to identifying the best ML algorithm:

join a training dataset of the first application with a pattern of SNI signals communicated over the wireless telecommunications network,
  wherein the training dataset is collected locally at the first wireless device over a time period,
  wherein the best ML algorithm produces outputs most like the pattern of SNI signals joined with the training dataset.

3. The computer-readable storage medium of claim 1, wherein to identify the one or more best ML algorithms comprises causing the system to:

identify a classifier algorithm configured to predict whether the first application is utilized by the first wireless user device; and
identify a regression algorithm configured to predict a duration that the first application was utilized by the first wireless user device.

4. The computer-readable storage medium of claim 1, wherein the captured SNI signals are from any of:
- the first application running in focus on the second wireless device,
- a web-browser version of the first application running on the second wireless device, or
- the first application running as a background application on the second wireless device.

5. The computer-readable storage medium of claim 1, wherein to identify the one or more best ML algorithms, the system is caused to:
- rank each of the multiple ML algorithms based on a respective score for predicting a utilization or an amount of utilization of the first application,
  - wherein any higher ranked ML algorithms provide greater confidence of predicting the first application as the source of the SNI signals compared to any lower ranked ML algorithms;
- selecting a highest ranked ML algorithm as the best ML algorithm,
  - wherein the multiple ML algorithms include two or more of:
    - a naïve bayes classifier algorithm,
    - an ensemble methods algorithm,
    - a support vector machine algorithm,
    - a linear regression algorithm,
    - a logistic regression algorithm,
    - an artificial neural networks algorithm,
    - a decision trees algorithm,
    - a random forests algorithm, or
    - a nearest neighbors algorithm.

6. The computer-readable storage medium of claim 1, wherein the system is further caused to:
- obtain an indication of the second wireless user device,
  - wherein the indication of the second wireless user device anonymizes the second wireless device;
- store the indication of the second wireless device at the database,
  - wherein the database maps the second wireless device to the second application; and
- monitor an amount or frequency that the second wireless device utilizes the second application based on associated SNI signals that are captured on the wireless telecommunications network.

7. The computer-readable storage medium of claim 1, wherein the second wireless user device corresponds to the first wireless user device, and the second application is different from the first application, and wherein the system is further caused to:
- determine that the first application and the second application have a correlated utilization; and
- store an indication of the correlated utilization at the database.

8. The computer-readable storage medium of claim 1, wherein the second wireless user device corresponds to the first wireless user device, and the second application corresponds to the first application, the system being further caused to:
- estimate utilization of the second application by the second wireless device based on an amount of data uploaded or downloaded during a time period in association with the captured SNI signals.

9. The computer-readable storage medium of claim 1, wherein the second wireless user device is different from the first wireless user device, and the second application is different from the first application, the system being further caused to:
- independently monitor ongoing utilization of the first application by the first wireless user device and ongoing utilization of the second application by the second wireless user device.

10. The computer-readable storage medium of claim 1, wherein the second wireless user device is different from the first wireless user device, and the second application corresponds to the first application, the system being further caused to:
- perform ongoing utilization monitoring of both the first application and the second application by the second wireless user device.

11. The computer-readable storage medium of claim 1, wherein the system is further caused to:
- refresh the first profile to map to another ML algorithm selected from among the multiple ML algorithms that provides greater confidence of predicting the first application as the source of the SNI signals,
  - wherein the first profile is refreshed periodically or in response to a change to the first application.

12. The computer-readable storage medium of claim 1, wherein the system is further caused to:
- process a pattern of SNI signals communicated over the wireless telecommunications network from the second wireless device,
  - wherein the pattern of SNI signals is different from SNI signals stored in association with a second profile,
- predict that the pattern of SNI signals is for the second application based on the second ML algorithm.

13. A system configured to select an algorithm for predicting applications, the system comprising: at least one hardware processor; and at least one non-transitory memory storing instructions, which, when executed by the at least one hardware processor, cause the system to:
- capture network traffic communicated over a communications network from a user device, wherein the network traffic includes a network signal that indicates a host to which an application on the user device seeks to establish a connection;
- process the network signal through each of multiple different predictive algorithms to generate a score indicative of an accuracy for predicting the application from which the network signal is sourced;
- associate the network signal with a predictive algorithm of the multiple different predictive algorithms that provides a most accurate prediction of the application from which the network signal is sourced;
- capture additional network traffic communicated over the communications network from multiple user devices; and
- predict, based on the predictive algorithm, that the network signal included in the additional network traffic is sourced from the application installed on the multiple user devices.

14. The system of claim 13 being further caused to:
- estimate utilization of the application relative to the multiple user devices based on an upload or download associated with network signals of the application communicated over the communication network.

15. A method for monitoring multiple applications of multiple user devices on a telecommunications network, the method comprising:
- capturing network traffic communicated from the multiple user devices over the telecommunications network to multiple servers,
  - wherein the network traffic is associated with multiple applications on multiple user devices, and wherein the network traffic includes different patterns of network signals;

profiling the different patterns of network signals based on different types of Machine Learning (ML) algorithms configured to predict whether the network traffic is sourced from any of the multiple applications, wherein each pattern of network signals is associated with a preferred ML algorithm of the different types of ML algorithms that is dynamically selected to optimize a prediction of whether any network signal is sourced from a particular application; and monitor utilization of the multiple applications based on an output of different ML algorithms of the different types of ML algorithms.

16. The method of claim 15 further comprising:

estimating, based on the output of the different ML algorithms, a frequency or duration of utilization of a particular application across a group of user devices.

17. The method of claim 15 further comprising:

estimating, based on the output of the different ML algorithms, a quantity of installs of a particular application across multiple user devices.

18. The method of claim 15 further comprising:

monitoring, based on a particular ML algorithm designated for the particular application, utilization of the particular application for a particular user device.

19. The method of claim 15 further comprising:

determining that a particular ML algorithm has a higher accuracy for predicting a particular application as a source of particular network signals based on a pattern of network signals and relative to a current ML algorithm for the pattern of network signal, replacing the current ML algorithm for the pattern of network signals with the particular ML algorithm.

20. The method of claim 15 further comprising:

determining relationships between two or more applications based on a common utilization pattern.

* * * * *